June 6, 1939.  H. C. BOWEN  2,161,278
BRAKE
Filed Feb. 16, 1937
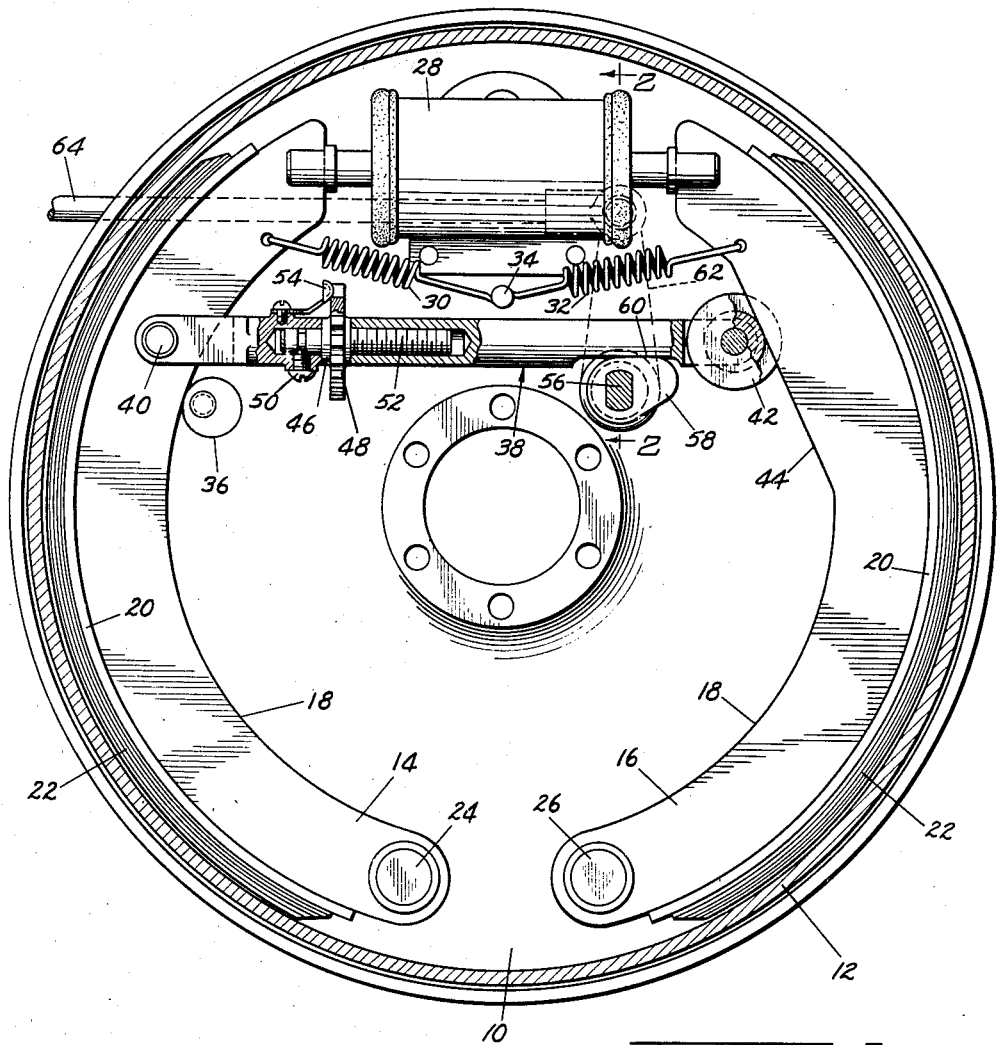
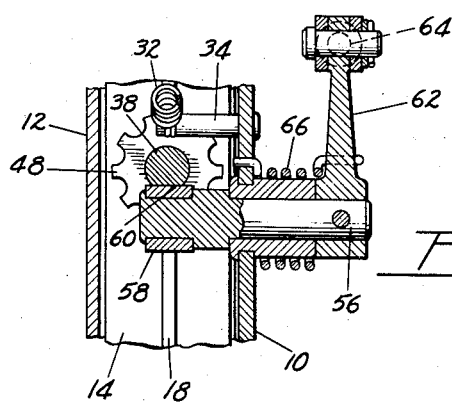
INVENTOR.
HERBERT C. BOWEN
BY Williams, Bradbury,
McCaleb & Hinkle
ATTORNEYS.

Patented June 6, 1939

2,161,278

UNITED STATES PATENT OFFICE 2,161,278

BRAKE

Herbert C. Bowen, Detroit, Mich., assignor to Hydraulic Brake Company, Detroit, Mich., a corporation of California Application February 16, 1937, Serial No. 126,038

7 Claims. (Cl. 188—106)

This invention relates to brakes, and more particularly to internal expanding brakes for motor vehicles.

Broadly the invention comprehends a combined fluid pressure actuated service brake and a mechanically actuated emergency or parking brake both employing the same friction elements or shoes.

An object of the invention is to provide duplex means for actuating the friction elements of a brake.

Another object of the invention is to provide a simplified adjusting means for the friction elements of a brake.

Another object of the invention is to equip a conventional fluid pressure actuated brake for motor vehicles with a simple mechanical linkage for effectively actuating the brake in emergencies, or when parking.

A further object of the invention is to provide a duplex brake comprising but few parts yet highly efficient in operation, and of marked simplicity as a whole and in respect to each of its component parts to the end that its manufacture and assembly may be economically facilitated.

Other objects of the invention will appear from the following description taken in connection with the drawing forming a part of this specification, and in which—

Fig. 1 is a vertical sectional view of a brake taken just back of the head of the drum showing the brake mechanism partly in elevation and partly in section, and illustrating the invention as applied; and Fig. 2 is a sectional view substantially on line 2—2, Fig. 1.

Referring to the drawing for more specific details of the invention, 10 represents a support or backing plate which may be secured on an axle or on an axle housing of a motor vehicle, and associated with the backing plate is a rotatable drum 12 adapted to be secured to a wheel of the vehicle. A pair of frictional elements or shoes 14 and 16 suitably mounted on the backing plate each includes a web 18 supporting a rim 20 having suitably secured thereto a frictional lining 22 adaptable for cooperation with the drum.

The articulate ends of the friction elements or shoes are pivoted on the backing plate as indicated at 24 and 26, and a fluid pressure actuated motor 28 is mounted on the backing plate between the separable ends of the friction elements or shoes. The motor is operative to spread the shoes into engagement with the drum 12 against the resistance of retractile springs 30 and 32 connecting the respective friction elements or shoes to a fixed support 34 arranged on the backing plate.

An adjustable stop 36 suitably mounted on the backing plate supports the friction element or shoe 14 in proper spaced relation to the drum 12 when in its retracted position and inhibits displacement thereof when in this position. The tensile strength of the spring 30 is slightly greater than the tensile strength of the spring 32.

The emergency or parking brake includes a sectionalized rod 38 having one of its ends pivoted to the shoe 14 as indicated at 40, and mounted in the other end of the rod is a grooved roller 42 straddling the web of the friction element or shoe 16 adapted to travel on a straight section 44 constituting a cord of the web. The sections of the rod 38 are connected by an adjusting means including a pin 46 having thereon intermediate its length a star wheel 48.

One end of the pin 46 is rotatable in one section of the rod and is held against displacement by a set screw 50; and the other end of the pin is threaded in the other section of the rod as indicated at 52. By turning the wheel, the overall length of the rod may be increased or decreased so as to support the friction element or shoe 16 in proper spaced relation to the drum when in its retracted position; and a spring latch 54 secured to one section of the rod 38 engages the star wheel 48 so as to retain the rod 38 in adjusted position.

An actuating shaft 56 suitably mounted on the backing plate has on one end thereof a cam 58 for cooperation with a flat 60 on the rod 38, and keyed on the other end of the shaft is an arm 62 connected as by a rod 64 to a source of power, not shown. A spring 66 wound on the journal of the shaft 56 with its ends connected respectively to the backing plate 10 and to the arm 62 serves to return the emergency actuating mechanism to its retracted position.

When the brake is operated as a service brake, a suitable fluid pressure producing device delivers fluid under pressure to the motor 28. This causes actuation of the motor, resulting in moving the friction elements or shoes 14 and 16 into engagement with the drum 12 against the resistance of the retractile springs 30 and 32, and this actuation of the shoes effectively retards rotation of the drum.

Upon conclusion of a braking operation, the pressure on the fluid is released, whereupon the friction elements or shoes are moved to their retracted positions under the influence of the retractile springs 30 and 32. As the shoes move to their retracted positions, the motor resumes its retracted position, and this results in returning fluid from the motor to the fluid pressure producing device.

In the operation of the brake as an emergency or parking brake, force applied to the cable or rod 64 is transmitted through the arm 62 to the shaft 56. This results in rocking the shaft, and upon this movement of the shaft the cam 58 carried thereby actuates the rod 38. During this movement of the rod the roller 42 on the free end of the rod travels on the web of the shoe 16, resulting in spreading the shoes 14 and 16 into engagement with the drum and effectively retarding rotation thereof.

Upon conclusion of this braking operation, the force applied to the cable or rod 64 is released, whereupon the friction elements or shoes 14 and 16 are returned to their retracted positions under the influence of retractile springs 30 and 32, and simultaneously therewith the operating lever 62 is returned to its retracted position under the influence of the spring 66.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A brake comprising a support, a rotatable drum associated therewith, a pair of friction elements pivoted on the support means for moving the elements into engagement with the drum, and auxiliary means for moving the elements into engagement with the drum including an adjustable rod pivoted on one of the elements, a roller mounted on the rod and adapted to travel on the other element, and cam mechanism for swinging the rod on its pivot.

2. A brake comprising a support, a drum associated therewith, a pair of oppositely disposed friction elements arranged on the support for cooperation with the drum, means for actuating the elements, and auxiliary means for actuating the elements including a rod having one of its ends pivoted on one of the elements, a roller on the other end of the rod adapted to travel on the other element, means for adjusting the length of the rod, and cam mechanism for swinging the rod on its pivot.

3. A brake comprising a fixed support, a rotatable drum associated therewith, a pair of oppositely disposed friction elements arranged on the support for cooperation with the drum, one of the elements having a straight edge, means for actuating the elements, an auxiliary means for actuating the elements including a rod having one of its ends pivoted on one of the friction elements, a grooved roller mounted on the other end adapted to travel on the straight edge, means for adjusting the length of the rod, and cam mechanism for swinging the rod on its pivot.

4. A brake comprising a fixed support, a rotatable drum associated therewith, a pair of friction elements arranged on the support for cooperation with the drum, an adjustable stop on the support for one of the elements, means urging this element to engage the stop, hydraulic means for actuating the elements, mechanical means for actuating the elements including a rod having one of its ends pivotally connected to one of the elements, a grooved roller on the other end of the rod adapted to travel on the web of the other element, means urging this element to engage the roller, and cam mechanism for swinging the rod on its pivot.

5. A brake comprising a fixed support, a rotatable drum associated therewith, a pair of friction elements arranged on the support for cooperation with the drum, an adjustable stop for supporting one of the elements, means restraining movement of this element from the stop, hydraulic means for actuating the elements, mechanical means for actuating the elements including a rod having one of its ends pivoted on the element supported by the stop, a grooved roller on the other end of the rod adapted to receive and travel on the web of the other element, means urging this other element to engage the roller, and cam mechanism supporting the rod and operative to swing the rod on its pivot.

6. In a brake including a drum and two pivoted friction members capable of bearing against the inner surface of said drum, an adjustable thrust rod for urging said members into frictional engagement with said drum, and comprising a section pivoted to one of said friction members, a second section bearing against the second of said friction members through the agency of a roller carried by said section, a pin rotatable in the first section of the thrust member and threaded in the second section of said thrust member, adjustable means for turning said pin thereby varying the length of the thrust rod.

7. A brake comprising a support, a rotatable drum associated therewith, a pair of friction elements pivoted on the support, hydraulic means for moving the elements into engagement with the drum, auxiliary means for moving the elements into engagement with the drum including an adjustable rod pivoted on one of the elements comprising two sections separated by rotatable means for varying the distance between said sections and for rigidly supporting said sections in substantially coaxial relationship, a roller mounted on the rod and adapted to travel on the other element, and cam mechanism for swinging the rod on its pivot.

HERBERT C. BOWEN.